United States Patent Office 3,417,096
Patented Dec. 17, 1968

3,417,096
CERTAIN 5(1-BENZOYL-3-INDOLYLMETHYL)
TETRAZOLES
Peter Frederick Juby, Syracuse, N.Y., assignor to Bristol-Myers Company, New York, N.Y., a corporation of Delaware
No Drawing. Filed July 1, 1965, Ser. No. 468,917
5 Claims. (Cl. 260—308)

This invention relates to novel compounds. More particularly, this invention relates to novel compounds which possess valuable therapeutic utility as anti-inflammatory agents and to processes useful in the preparation thereof.

It is an object of this invention to provide a new class of therapeutic compounds. It is another object of this invention to provide novel nonsteroidal compounds having anti-inflammatory activity. It is still another object of this invention to provide anti-inflammatory agents which do not cause the stomach irritation which is characteristic of presently available anti-inflammatory agents. It is a further object of this invention to provide a novel process for preparing the novel therapeutic compounds.

These and other objects which may appear as the specification proceeds are achieved by this invention which comprises the provision of compounds selected from the group consisting of compounds having the following formula (I) 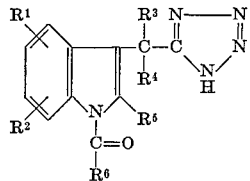

wherein
$R^1$ and $R^2$ each represent a member selected from the group consisting of hydrogen, chloro, bromo, fluoro, iodo, trifluoromethyl, (lower)alkyl, (lower)alkoxy, (lower)alkylthio, (lower)alkenyl, (lower)alkenyloxy, trifluoromethyloxy, trifluoromethylthio, hydroxy, nitro, amino, (lower)alkylamino, di(lower)alkylamino, (lower)alkanoylamino, (lower)alkanoyl, bis[hydroxy(lower)alkyl]amino, 1-pyrrolidino, 4-(lower-alkyl-1-piperazino, 4-morpholino, 1-hexamethyleneimino, 1-piperidino, 1-1,2,5,6 - tetrahydropyridino, amino(lower)-alkyl, di(lower)alkylamino(lower)alkyl, di(lower)-alkylsulfamyl, phenyl, phenoxy, phenylthio, (lower)-alkylphenylthio, (lower)alkylphenoxy, (lower)alkoxyphenylthio, (lower)alkoxyphenoxy, halogenophenylthio, halogenophenoxy, benzylthio, (lower)alklbenzylthio, (lower)alkoxybenzylthio, halogenobenzylthio, benzyloxy, (lower)alkylbenzyloxy, (lower)alkoxybenzyloxy, halogenobenzyloxy, 1-aza-cyclopropyl, cyclopropylmethyloxy and cyclobutylmethyloxy;
$R^3$ is a member selected from the group consisting of hydrogen, (lower)alkyl and trifluoromethyl;
$R^4$ is a member selected from the group consisting of hydrogen and (lower)alkyl;
$R^5$ is a member selected from the group consisting of hydrogen, (lower)alkyl, trifluoromethyl, (lower)alkenyl and phenyl;
$R^6$ is a member selected from the group consisting of radicals of the formulae (II) 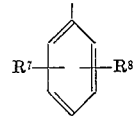

(III) 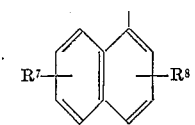

wherein $R^7$ and $R^8$ each represent a member selected from the group consisting of hydrogen, chloro, bromo, fluoro, iodo, trifluoromethyl, (lower)alkyl, (lower)-alkoxy, (lower)alkylthio, trifluoromethoxy, trifluoromethylthio, phenyl, phenoxy, halogenophenoxy, (lower)alkylphenoxy, (lower)alkoxyphenoxy, phenylthio, (lower)alkylphenylthio, (lower)alkoxyphenylthio, halogenophenylthio, trifluoroacetyl, difluoroacetyl, monofluoroacetyl, di(lower)alkylsulfamyl, (lower)alkanoyl, di(lower)alkylcarboxamido, cyano, carboxy, carb-(lower)alkoxy, (lower)alkysulfinyl, (lower)alkylsulfonyl, benzylthio, (lower)alkylbenzylthio, (lower)alkoxybenzylthio, halogenobenzylthio, mercapto, nitro, amino, (lower)alkylamino, di(lower)alkylamino, (lower)alkanoylamino, hydroxy, (lower)alkanoyloxy, trifluoroacetoxy, difluoroacetoxy, monofluoroacetoxy, benzyloxy, (lower)alkylbenzyloxy, (lower)alkoxybenzyloxy and halogenobenzyloxy; and the pharmaceutically acceptable nontoxic salts thereof.

The pharmaceutically acceptable nontoxic salts of the compounds of this invention include the nontoxic metallic salts such as sodium, potassium, calcium, aluminum and the like, the ammonium salt and substituted ammonium salts, e.g., salts of such nontoxic amines as trialkylamines, including triethylamine, procaine, dibenzylamine, N-benzyl-β-phenethylamine, 1-ephenamine, N,N'-dibenzylethylenediamine, dehydroabietylamine, N,N' - bis - dehydroabietylethylenediamine, N-(lower)alkylpiperidines, e.g. N-ethylpiperidine, morpholine, dimethylamine, methylcyclohexylamine, glucosamine and other amines which have been used to form salts with benzylpenicillin.

The term "(lower)alkyl" as used herein means both straight and branched chain aliphatic hydrocarbon radicals having from 1 to 8 carbon atoms, e.g. methyl, ethyl, propyl, isopropyl, butyl, isobutyl, sec-butyl, t-butyl, amyl, hexyl, 2-ethylhexyl, octyl, etc.

The term "(lower)alkenyl" as used herein means both straight and branched chain alkenyl radicals having from 2 to 8 carbon atoms, e.g. ethenyl, allyl, 1-propenyl, 1-butenyl, 3-butenyl, 2-methyl-1-propenyl, 3-pentenyl, 1-hexenyl, 7-octenyl, etc.

Similarly, where the term "(lower)" is used as part of the description of another group, e.g., (lower)alkoxy, it refers to the alkyl portion of such group which is therefore as described in connection with (lower)alkyl.

The term "halogeno" as used herein means halogen radicals, e.g. chloro, bromo, fluoro and iodo.

A preferred group of compounds of the present invention are those of the formula (IV) 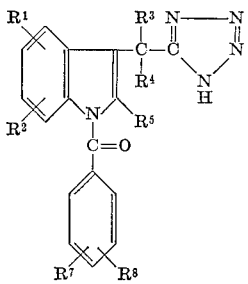

wherein $R^1$, $R^2$, $R^3$, $R^4$, $R^5$, $R^7$ and $R^8$ are as described above, and the pharmaceutically aceptable nontoxic salts thereof. Preferably, the substituents $R^1$ and $R^2$ each are hydrogen, chloro, bromo, fluoro, trifluoromethyl, (lower)-alkoxy and hydroxy; $R^3$ is hydrogen, (lower)alkyl and trifluoromethyl; $R^4$ is hydrogen and (lower)alkyl; $R^5$ is hydrogen, (lower)alkyl and trifluoromethyl; and $R^7$ and $R^8$ each are hydrogen, chloro, bromo, fluoro, trifluoromethyl, (lower)alkyl and (lower)alkoxy.

Particularly useful compounds within the preferred group of compounds are those of the formula V) 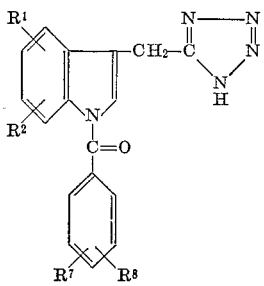

wherein $R^1$ and $R^2$ each represent hydrogen, chloro, bromo, fluoro, trifluoromethyl, (lower)alkyl, (lower)alkoxy and hydroxy; $R^7$ and $R^8$ each represent hydrogen, chloro, bromo, fluoro, trifluoromethyl, (lower)alkyl and (lower)alkoxy; and those of the formula (VI) 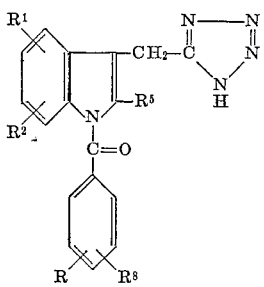

wherein $R^1$ and $R^2$ each represent hydrogen, chloro, bromo, fluoro, trifluoromethyl, (lower)alkyl, (lower)alkoxy and hydroxy; $R^5$ represents (lower)alkyl; and $R^7$ and $R^8$ each represent hydrogen, chloro, bromo, fluoro, trifluoromethyl, (lower)alkyl and (lower)alkoxy.

The compounds of this invention have a high degree of anti-inflammatory activity, making them potent anti-inflammatory agents; and are useful in treating arthritis, rheumatism and other inflammatory diseases in mammals.

Anti-inflammatory tests of the compounds of the present invention were carried out on rats using the carrageenin-induced foot edema test of Charles A. Winter et al., Carrageenin-Induced Edema in Hind Paw of the Rat as an Assay for Anti-inflammatory Drugs, Proceedings of the Society for Experimental Biology and Medicine, 111, 544 (1962). The compound under investigation was given orally to the rat, and one hour later carrageenin was injected subcutaneously into one paw. Three hours later the degree of edema was measured volumetrically by fluid displacement, and compared to that of the control paw to give a result presented in terms of percentage inhibition of edema. Any result of more than 30% inhibition was greater than three times the standard deviation of the result in control animals, and thus clearly indicated anti-inflammatory activity.

In the test described above, a preferred compound of the present invention having the formula (VII) 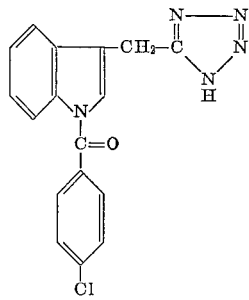

gave the following percentage inhibition of edema at the dosages in mg./kg. given in parentheses: 64.8 (256), 54.9 (128), 37.6 (64), 36.9 (32), 26.6 (16), 11.3 (4). There is no indication that this compound causes gastrointestinal irritation. This compound has an $LD_{50}$ (oral) of 1200 mg./kg. in the rat. Thus, this compound is a very potent anti-inflammatory agent, having a high therapeutic ratio, and one that does not cause stomach irritation.

The compounds of the present invention are preferably prepared as exemplified below by the acylation of the indole nitrogen atom of an indolyl tetrazole of the formula (VIII) 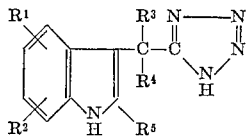

wherein $R^1$, $R^2$, $R^3$, $R^4$ and $R^5$ are as described above. The acylation reaction is preferably carried out by treating the indolyl tetrazole with two equivalents of sodium, sodamide, or an alkali metal hydride, e.g., sodium hydride, to form a di-alkali metal salt of the indolyl tetrazole, e.g., the disodium salt, and then contacting the salt with one equivalent of a halide of a carboxylic acid of the formulae (IX) 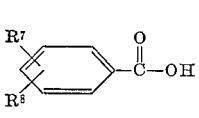  (X) 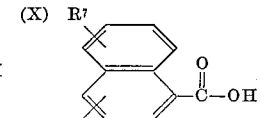

wherein $R^7$ and $R^8$ are as described above, and preferably the chloride or bromide in an anhydrous solvent medium at about 0° C. Suitable solvent media include dimethylformamide, dimethylformamide-benzene, benzene, toluene and xylene.

The acylation reaction may also be conducted by contacting the di-alkali metal salt with a phenolic ester of the carboxylic acid, e.g., the p-nitrophenyl ester, which is prepared by mixing the acid and p-nitrophenol in tetrahydrofuran and adding dicyclohexyl carbodiimide in tetrahydrofuran slowly. The dicyclohexylurea which forms is removed by filtration, and the nitrophenyl ester removed from the filtrate. Alternatively, the anhydride, azide or thiophenolic ester of the carboxylic acid can also be used. Use may be made of the acylation procedures described in U.S. Patent No. 3,161,654.

The indolyl tetrazoles of Formula VIII which are used as starting materials are either known compounds or are easily prepared in accordance with standard organic procedures previously described in the chemical literature.

The compounds may be prepared by reacting a nitrile of the formula (XI) 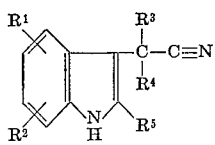

wherein $R^1$, $R^2$, $R^3$, $R^4$ and $R^5$ are as described above, with at least an equimolar weight of an azide and preferably an inorganic azide, e.g. sodium azide, lithium azide, tetramethylammonium azide, trimethylammonium azide, ammonium azide, aluminum azide, morpholinium azide, piperidinium azide or hydrazoic acid, in a liquid (and preferably anhydrous) medium for at least 12 hours at temperatures above room temperature and preferably in the range of about 80° C. to about 140° C. to produce an indolyl tetrazole of Formula VIII. If desired, there may be added as a catalyst a Lewis acid, e.g. boron trifluoride-etherate, tetra-alkylammonium chlorides, aniline hydrochloride, ammonium chloride, lithium chloride. Suitable liquid media include the monomethyl and ethyl ethers of ethylene and diethylene glycol and tetrahydrofuran, n-butanol and particularly dimethyl sulfoxide and dimethylformamide. The azidic compound may be added per se or prepared in situ. In particular, use may be made of the procedures of U.S. Patents 2,977,372, 3,155,666, 3,123,615 and those given by McManus et al., J. Org. Chem., 24, 1464 (1959); Finnegan et al., J. Amer. Chem. Soc., 80, 3908–3911 (1958); F. R. Benson, Chem. Rev., 41, 1 (1947); or in E. H. Rodd, Chemistry of Carbon Compounds, IV, 481–486, D. H. van Nostrand Co. Inc., New York, N.Y. (1957); or in the references cited therein for the preparation of 5-substituted tetrazoles.

The materials used for the preparation of the nitriles of Formula XI are compounds which are either commercially available, well known in the art, or easily prepared in accordance with standard organic procedures previously described in the chemical literature.

For example, the nitriles of Formula XI, wherein $R^3$ and $R^4$ are hydrogen, may be prepared by the reaction of an indole of the formula (XII) 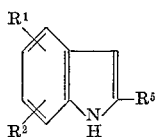

wherein $R^1$, $R^2$ and $R^5$ are as described above, with formaldehyde and dimethylamine (or N-methylaniline) to form a Mannich base. The Mannich base or a quaternary salt derivative, e.g., methiodide, may then be treated with an alkali metal cyanide to form the nitrile. The nitriles may also be prepared by first making the corresponding indole-3-acetic acids (or esters) of the formula (XIII) 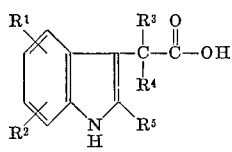

wherein $R^1$, $R^2$, $R^3$, $R^4$ and $R^5$ are as described above, by standard procedures, such as the well known Fischer indole synthesis. The acids (or their esters) may readily be converted to the corresponding nitriles by first converting the acids to their corresponding amides and then dehydrating the amides to the nitriles. This procedure is particularly applicable to those nitriles wherein $R^3$ and/or $R^4$ in Formula XI are other than hydrogen. Many of the indoles of Formula XII are described in U.S. Patent No. 3,161,654.

Various procedures for the preparation of the nitriles are described by H. Wieland, W. Konz and H. Mittasch, Ann., 513, 1 (1934); J. Szmuszkovicz, N. C. Anthony and R. V. Heinzelman, J. Org. Chem., 25, 857 (1960); and J. Thesing, S. Klüssendorf, P. Ballach and H. Mayer, Ber., 88, 1295 (1955).

The compounds of this invention are acidic and may be administered in their free form or in the form of their nontoxic salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally or parenterally, in an effective amount are effective in the treatment of inflammatory diseases.

The following examples are intended to illustrate the invention described herein without unduly restricting it.

EXAMPLE 1

Preparation of 5-methoxy-3-indolylacetonitrile

Formalin (19.5 gm. of a 40% weight by volume solution, 0.24 mol of formaldehyde) was added, with stirring, to a solution of 5-methoxyindole (35.0 gm., 0.238 mol) and N-methylaniline (26.8 gm., 0.25 mol) in methanol (24 ml.) at room temperature. The reaction mixture was stirred at room temperature for 2 hours. A solution of sodium cyanide (100.0 gm., 2.04 mol) in water (600 ml.) and ethanol (1 liter) was added to the reaction mixture which was heated under reflux for 2 hours. The ethanol was removed under reduced pressure. The residue was extracted twice with chloroform. The combined extracts were dried over sodium sulfate, and filtered. The filtrate was reduced to dryness to leave an orange-brown oil. The oil was redissolved in chloroform, and the solution rapidly washed with 10% aqueous hydrochloric acid, followed by water. The chloroform solution was dried over sodium sulfate, then reduced to dryness to leave a viscous orange-brown oil (39.5 gm. of crude product).

A portion of the crude product was extracted with dry ether. The extract was reduced to dryness and the residue distilled. The main fraction, an orange-yellow viscous oil, had B.P. 175–177° C./0.01 mm.

*Analysis.*—Calc'd for $C_{11}H_{10}N_2O$: C, 70.95; H, 5.41; N, 15.05. Found: C, 71.00; H, 5.44; N, 14.95.

EXAMPLE 2

Preparation of 5-methoxy-2-methyl-3-indolylacetonitrile (A) Ethyl 5 - methoxy-2-methyl-3-indoleacetate.—The indoleacetate was prepared by a method similar to that described by E. Shaw, J. Am. Chem. Soc., 77, 4319 (1955). p-Anisidine (76.0 gm.) was converted to p-methoxyphenylhydrazine. The crude hydrazine was immediately reacted with ethyl levulinate (50 ml.) to form the corresponding unstable p-methoxyphenylhydrazone (90.0 gm.). A Fischer rearrangement of the crude hydrazone yielded the ethyl 5-methoxy-2-methyl-3-indoleacetate as a brown oil (81.5 gm.). The crude ester was used directly in the next reaction without further characterization.

(B) 5 - methoxy-2-methyl-3-indoleacetamide.—A solution of crude ethyl 5-methoxy-2-methyl-3-indoleacetate (81.5 gm.) and sodium methoxide (17.5 gm.) in methanol (800 ml.) was saturated with ammonia gas. The reaction mixture was allowed to stand at room temperature for a total of 64 hours, whilst being re-saturated with ammonia after 20 hours and 40 hours. The reaction mixture was reduced to dryness, and the residue partitioned between chloroform and water. The crystalline solid (45.0 gm.) which separated at the interface was collected by filtration. Additional solid (10.0 gm.) was recovered from the chloroform layer of the filtrate. Part of the product, M.P. 149–151° C., was recrystallized from ethyl acetate, followed by methanol, to give an off-white solid, M.P. 150–151° C.

(C) 5 - methoxy - 2 - methyl - 3-indolylacetonitrile.—A solution of 5-methoxy-2-methyl-3-indoleacetamide (30.0 gm., 0.138 mol) and triethylamine (30.0 gm., 0.297 mol) in phosphorus oxychloride (290 ml.) was heated under reflux for 0.5 hour. The excess phosphorus oxychloride was removed under reduced pressure. A chloroform solution of the residue was washed with an aqueous sodium carbonate solution until the aqueous washings remained basic. The chloroform solution was dried and reduced to dryness on a rotating evaporator. The brown solid residue was exhaustively extracted with diethyl ether. The combined ether extracts were reduced in volume, with the addition of "Skellysolve B." A crystalline product eventually separated from the solution. The product (24.5 gm.) was recrystallized twice from ether to give off-white crystals, M.P. 115–116° C.

*Analysis.*—Calcd. for $C_{12}H_{12}N_2O$: C, 71.98; H, 6.04; N, 13.99. Found: C, 71.76; H, 6.15; N, 14.16.

EXAMPLE 3

Preparation of 5-chloro-2-methyl-3-indolylacetonitrile

A solution of 5-chloro-2-methylgramine (5.0 gm., 0.0224 mol) in tetrahydrofuran (30 ml.) was added over a period of 15 minutes to methyl iodide (29 ml.) which was cooled in an ice/water bath. The reaction mixture was stirred for 17 hours whilst its temperature was allowed to rise slowly to room temperature. The solid 5-chloro-2-methylgramine methiodide (7.72 gm.) was collected and well washed with diethyl ether.

The methiodide (7.72 gm., 0.0212 mol) was added, with stirring, to a solution of potassium cyanide (13.8 gm., 0.212 mol) in water (85 ml.). The temperature of the reaction mixture was slowly (20 minutes) raised to 80° C., and was maintained at this temperature for 2 hours. The cooled reaction mixture was filtered. The collected solid (3.91 gm.) had M.P. 126–136° C. Part of the solid was recrystallized three times from aqueous ethanol to give 5-chloro-2-methyl-3-indolylacetonitrile as long, off-white needles, M.P. 142–144° C.

EXAMPLE 4

Preparation of 5-(3-indolylmethyl)tetrazole

A mixture of 3-indolylacetonitrile (10.0 gm., 0.064 mol), sodium azide (4.2 gm., 0.0646 mol), and ammonium chloride (3.5 gm., 0.0654 mol) in dimethylformamide (60 ml.) were heated, with stirring, at about 100° C. for 14 hours. The reaction mixture was reduced to dryness. The residue was suspended in water which was acidified to pH 2. The residue crystallized upon cooling and with trituration. The solid was collected and recrystallized with treatment with decolorizing charcoal, from water to give a buff crystalline product (8.5 gm.). Successive recrystallizations of the product from ethyl acetate/"Skellysolve B" (B.P. 60–68° C.), water, and finally ethyl acetate/"Skellysolve B" gave 5-(3-indolylmethyl)tetrazole as off-white crystals, M.P. 182–183° C.

EXAMPLE 5

Preparation of 5-[1-(4-chlorobenzoyl)-3-indolylmethyl]-tetrazole

A solution of 5-(3-indolylmethyl)tetrazole (12.5 gm., 0.0628 mol) in dimethylforamide (50 ml.) was slowly added with stirring to a cooled (ice/water bath) suspension of sodium hydride (5.5 gm. of a 58.6% sodium hydride dispersion in mineral oil, 0.134 mol of sodium hydride) in dimethylformamide (50 ml.). The reaction mixture was allowed to warm to room temperature (about 25° C.) when stirring was continued for 15 minutes. The reaction mixture was cooled (ice/water bath), when a solution of p-chlorobenzoyl chloride (12.0 gm., 0.0685 mol) in dimethylformamide (30 ml.) was added dropwise over a period of 25 minutes. The reaction mixture was then stirred at room temperature for 1 hour.

The reaction mixture was filtered. The filtrate was reduced to dryness in a rotating evaporator at 40° C. The residue was treated with a small volume of methanol, then again reduced to dryness. A solution of the residue in cold water was acidified with concentrated hydrochloric acid. The precipitated solid (15.0 gm.) was crystallized from methanol to give pale yellow crystals, M.P. 229–230° C., with a crystal structure change at 105–115° C. The product was recrystallized successively from chloroform, methanol and chloroform, and finally dried at 100° C./0.03 mm. for 3 hours to give 5-[1-(4-chlorobenzoyl)-3-indolylmethyl]tetrazole as colorless crystals, M.P. 233–234° C.

*Analysis.*—Calcd. for $C_{17}H_{12}ClN_5O$: C, 60.46; H, 3.58; Cl, 10.50; N, 20.74. Found: C, 60.26; H, 3.55; Cl, 10.59; N, 21.04.

EXAMPLE 6

Preparation of 5-(5-methoxy-3-indolylmethyl)tetrazole

A mixture of crude 5-methoxy-3-indolylacetonitrile (33.0 gm., 0.177 mol), sodium azide (22.0 gm., 0.338 mol), and ammonium chloride (18.0 gm., 0.336 mol) in dimethylformamide (250 ml.) was heated, with stirring at about 140° C. for 17 hours. The reaction mixture was reduced to dryness and partitioned between aqueous sodium carbonate solution and chloroform. The aqueous layer was separated, washed with chloroform, then acidified with concentrated hydrochloric acid. The precipitated solid (19.5 gm.) was crystallized twice from water, after treatment with decolorizing charcoal, to give 5-(5-methoxy-3-indolylmethyl)tetrazole as pale salmon colored crystals, M.P. 188–189° C.

*Analysis.*—Calcd. for $C_{11}H_{11}N_5O$: C, 57.63; H, 4.84; N, 30.55. Found: C, 57.92; H, 4.99; N, 30.55.

EXAMPLE 7

Preparation of 5-[1-(4-chlorobenzoyl)-5-methoxy-3-indolylmethyl]tetrazole

A solution of 5-(5-methoxy-3-indolylmethyl)tetrazole (5.0 gm., 0.0218 mol) in dimethylformamide (25 ml.) was slowly added, with stirring, to a cooled (ice/water bath) suspension of sodium hydride (1.8 gm. of a 58.6% sodium hydride dispersion in mineral oil, 0.044 mol of sodium hydride) in dry dimethylformamide (25 ml.). The reaction mixture was allowed to warm to room temperature (about 25° C.) when stirring was continued for 15 minutes. The reaction mixture was cooled (ice/water bath), when a solution of p-chlorobenzoyl chloride (3.83 gm., 0.0219 mol) in dimethylformamide (10 ml.) was added dropwise over a period of 20 minutes. The reaction mixture was then stirred at room temperature for 1 hour.

The reaction mixture was filtered. The filtrate was reduced to dryness in a rotating evaporator at 40° C. An aqueous solution of the residue deposited an off-white crystalline solid on standing. The aqueous suspension was treated with concentrated hydrochloric acid until the supernatant liquid was at pH 2. The reaction mixture was filtered, and the collected solid (7.9 gm.) crystallized twice from ethanol followed by ethyl acetate to give 5-[1-(4-chlorobenzoyl) - 5 - methoxy - 3 - indolylmethyl] tetrazole as colorless crystals, M.P. 208–209° C. after being dried at 100° C. at 0.1 mm. for 2 hours. Infrared and proton magnetic resonance spectra and analytical data show the product to have retained (as solvent of crystallization) one half a molecule of ethyl acetate per molecule of tetrazole.

*Analysis.*—Calcd. for $C_{18}H_{14}ClN_5O_2 \cdot 1/2C_4H_8O_2$: C, 58.34; H, 4.41; Cl, 8.61; N, 17.01. Found: C, 58.79; H, 4.73; Cl, 8.85; N, 17.24.

EXAMPLE 8

Preparation of 5-(5-methoxy-2-methyl-3-indolylmethyl)tetrazole

A mixture of 5-methoxy-2-methyl-3-indolylacetonitrile (7.0 gm., 0.035 mol), sodium azide (4.5 gm., 0.0692 mol) and ammonium chloride (3.8 gm., 0.071 mol) in dimethylformamide (80 ml.) was heated, with stirring at 130–140° C. for 23 hours. The reaction mixture was reduced to dryness. The residue was partitioned between aqueous sodium carbonate solution and chloroform. The aqueous layer was separated and acidified with concentrated hydrochloric acid. The precipitated solid was recrystallized from water after treatment with decolorizing charcoal to give colorless crystals of 5-(5-methoxy-2-methyl-3-indolylmethyl)tetrazole, M.P. 194–195° C..

*Analysis.*—Calcd. for $C_{12}H_{13}N_5O$: C, 59.25; H, 5.39; N, 28.79. Found: C, 59.40; H, 5.42; N, 28.83.

EXAMPLE 9

Preparation of 5-[1-(4-chlorobenzoyl)-5-methoxy-2-methyl-3-indolylmethyl]tetrazole A solution of 5-(5-methoxy-2-methyl-3-indolylmethyl)tetrazole (5.0 gm., 0.0206 mol) in dimethylformamide (20 ml.) was slowly added with stirring to a cooled (ice/water bath) suspension of sodium hydride (1.75 gm. of a 58.6% sodium hydride dispersion in mineral oil, 0.0427 mol of sodium hydride) in dimethylformamide (20 ml.). The reaction mixture was allowed to warm to room temperature (about 25° C.) when stirring was continued for 55 minutes. The reaction mixture was cooled (ice/water bath), when a solution of p-chlorobenzoyl chloride (3.7 gm., 0.0212 mol) in dimethylformamide (20 ml.) was added dropwise over a period of 30 minutes. The reaction mixture was then stirred at room temperature for 1.5 hours.

The reaction mixture was filtered. The filtrate was reduced to dryness. The residue was treated with a small volume of methanol, then again reduced to dryness. An aqueous solution of the residue was acidified with concentrated hydrochloric acid. The precipitated solid was collected, washed with cold water and dried under vacuum. The solid was extracted with three portions of cold diethyl ether. The combined ether extracts were reduced to dryness. The residue crystallized from acetonitrile. The product (1.85 gm.) was recrystallized from acetonitrile to give pale yellow crystals, M.P. 222–224° C. Recrystallization from ethanol gave pale yellow crystals of 5-[1-(4-chlorobenzoyl)-5-methoxy-2-methyl - 3 - indolylmethyl]tetrazole, M.P. 225–226° C.

*Analysis.*—Calcd. for $C_{19}H_{16}ClN_5O_2$: C, 59.77; H, 4.23; Cl, 9.29; N, 18.35. Found: C, 59.91; H, 4.25; Cl, 9.44; N, 18.45.

EXAMPLE 10

Preparation of 5-[1-(2-chlorobenzoyl)-3-indolylmethyl]tetrazole

A solution of 5-(3-indolylmethyl)tetrazole (8.0 gm., 0.0402 mol) in dimethylformamide (30 ml.) was slowly added to a cooled (ice/water bath), stirred suspension of sodium hydride (3.52 gm. of a 58.6% sodium hydride dispersion in mineral oil, 0.086 mol of sodium hydride) in dimethylformamide (25 ml.). The mixture was stirred at 5–10° C. for 1 hour, then cooled again (ice/water bath). To this solution was added dropwise over a period of 30 minutes a solution of o-chlorobenzoyl chloride (7.7 gm., 0.044 mol) in dimethylformamide (25 ml.). The reaction mixture was then stirred at room temperature for 1 hour.

The reaction mixture was filtered. The filtrate was reduced to dryness in a rotating evaporator at 40° C. A solution of the residue in cold water was acidified with concentrated hydrochloric acid. The precipitated gummy solid was collected and dried. This crude product was extracted with 12 portions (250 ml. each) of diethyl ether. Potassium 2-ethylhexanoate in n-butanol (50%) was added to the combined extracts until no further precipitation of solid occurred. The precipitated solid was collected. A solution of the solid in cold water was acidified with concentrated hydrochloric acid. The off-white precipitated product was collected and dried giving 2.1 gm. of 5-[1-(2-chlorobenzoyl) - 3 - indolylmethyl]tetrazole, M.P. 96–119° C.

*Analysis.*—Calcd. for $C_{17}H_{12}ClN_5O$: Cl, 10.50. Found: Cl, 10.42.

EXAMPLE 11

Preparation of 5-[1-(3-chlorobenzoyl)-3-indolylmethyl]tetrazole

A solution of 5-(3-indolylmethyl)tetrazole (5.0 gm., 0.0251. mol) in dimethylformamide (20 ml.) was slowly added to a cooled (ice/water bath), stirred suspension of sodium hydride (2.1 gm. of a 58.6% sodium hydride dispersion in mineral oil, 0.0513 mol of sodium hydride) in dimethylformamide (20 ml.). Stirring, with the temperature of the reaction mixture being allowed to warm to room temperature (about 25° C.) was continued for 45 minutes. The resulting solution was cooled with an ice/water bath. To this solution was added dropwise over a period of 30 minutes a solution of m-chlorobenzoyl chloride (4.4 gm., 0.0252 mol) in dimethylformamide (20 ml.). The reaction mixture was then stirred at room temperature for 1 hour after which it was allowed to stand at 5° C. for 40 hours.

The reaction mixture was filtered. The filtrate was reduced to dryness in a rotating evaporator. An aqueous solution of the residue was acidified with concentrated hydrochloric acid. The precipitated solid was collected and crystallized from methanol to give pale yellow crystals (3.6 gm.) of 5-[1-(3-chlorobenzoyl)-3-indolylmethyl]tetrazole, M.P. 188–191° C. The product was recrystallized twice from ethyl acetate to give off-white crystals, M.P. 190–191° C.

EXAMPLE 12

Preparation of 5-[1-(4-methoxybenzoyl)-3-indolylmethyl]tetrazole

In a manner similar to that described for the preparation of 5-[1-(3-chlorobenzoyl)-3-indolylmethyl]tetrazole, 5-(3-indolylmethyl)tetrazole (5.0 gm., 0.251 mol) was reacted with p-methoxybenzoyl chloride (4.3 gm., 0.0252 mol). The precipitated crude product was washed successively with water, "Skellysolve B," and cold methanol, and was finally crystallized from methanol to give off-white crystals (5.7 gm.), M.P. 182–183° C. (melting and resetting at 93–95° C.). The 5-[1-(4-methoxybenzoyl) - 3 - indolylmethyl]tetrazole was recrystallized from ethyl acetate to give very pale orange crystals, M.P. 182–183° C.

*Analysis.*—Calcd. for $C_{18}H_{15}N_5O_2$: C, 64.85; H, 4.54; N, 21.01. Found: C, 65.11; H, 4.50; N, 21.20.

EXAMPLE 13

Preparation of 5-[1-(4-methylthiobenzoyl)-3-indolylmethyl]tetrazole

In a manner similar to that described for the preparation of 5 - [1 - (3 - chlorobenzoyl) - 3 - indolylmethyl]tetrazole, 5-(3-indolylmethyl)tetrazole (5.0 gm., 0.0251 mol) was reacted with p-methylthiobenzoyl chloride (4.7 gm., 0.0252 mol). The precipitated crude product was collected, dried, washed with cold methanol, dried again, and finally washed with "Skellysolve B." The solid was crystallized from acetone to give 5-[1-(4-methylthiobenzoyl)-3-indolylmethyl]tetrazole (4.6 gm.) as off-white crystals, M.P. 200–202° C. Recrystallization from acetone followed by ethyl acetate gave off-white crystals, M.P. 201.5–202.5° C.

*Analysis.*—Calcd. for $C_{18}H_{15}N_5OS$: N, 20.04. Found: N, 20.21.

EXAMPLE 14

Preparation of 5-[1-(3-trifluoromethylbenzoyl)-3-indolylmethyl]tetrazole 5-(3-indolylmethyl)tetrazole (5.0 gm., 0.0251 mol) was reacted with m-trifluoromethylbenzoyl chloride (5.25 gm., 0.0252 mol) by a procedure similar to that described for the preparation of 5-[1-(3-chlorobenzoyl)-3-indolylmethyl]tetrazole. The precipitated product was triturated and washed with a small volume of ice-cold methanol to give 5[1-(3-trifluoromethylbenzoyl - 3 - indolylmethyl] tetrazole (4.05 gm.) as a very pale yellow crystalline material. The product was recrystallized twice from ethyl acetate to give off-white crystals, M.P. 213–214.5° C.

EXAMPLE 15

Preparation of 5-[1-(4-trifluoromethylbenzoyl)-3-indolylmethyl]tetrazole

In a manner similar to that described for the preparation of 5-[1 - (3 - chlorobenzoyl) - 3 - indolylmethyl] tetrazole, 5-(3-indolylmethyl)tetrazole (5.0 gm., 0.0251 mol) was reacted with p-trifluoromethylbenzoyl chloride (5.25 gm., 0.0252 mol). The precipitated crude produce was washed with cold methanol followed by cold "Skellysolve B," and crystallized from ethyl acetate to give 5-[1-(4-trifluoromethylbenzoyl) - 3-indolylmethyl]tetrazole (3.9 gm.) as very pale yellow crystals, M.P. 250–251° C. Recrystallization of the product from ethyl acetate gave off-white crystals, M.P. 251–253° C. (decomposition).

*Analysis.*—Calcd. for $C_{18}H_{12}F_3N_5O$: C, 58.24; H, 3.26; N, 18.87. Found: C, 58.08; H, 3.40; N, 19.07.

EXAMPLE 16

Preparation of 5-[1-(3,4-dichlorobenzoyl)-3-indolylmethyl]tetrazole

5 - [1 - (3,4 - dichlorobenzoyl) - 3-indolylmethyl] tetrazole was prepared from 5 - (3 - indolylmethyl)tetrazole (5.0 gm., 0.0251 mol) and 3,4 - dichlorobenzoyl chloride (5.3 gm., 0.0253 mol) by a method similar to that described for the preparation of 5 - [1 - (3 - chlorobenzoyl) - 3 - indolylmethyl]tetrazole. The crude precipitated product was washed with a small volume of cold methanol, and crystallized from ethanol to give off-white crystals (3.1 gm.), M.P. 234–237° C. The product was recrystallized from ethyl acetate to give off-white crystals of 5 - [1 - (3,4 - dichlorobenzoyl) - 3-indolylmethyl]tetrazole, M.P. 241–242° C. (decomposition).

EXAMPLE 17

Preparation of 5-(5-benzyloxy-3-indolylmethyl)tetrazole

A mixture of 5 - benzyloxy - 3 - indolylacetonitrile (24.6 gm., 0.0937 mol), sodium azide (11.73 gm., 0.1806 mol) and ammonium chloride (9.66 gm., 0.1806 mol) in dimethylformamide (200 ml.) was heated, with stirring, at 130–142° C. for 24 hours. The cooled reaction mixture was reduced to dryness in a rotating evaporator. Potassium carbonate (about 30.0 gm.) was added to an aqueous suspension of the gummy residue. The suspension was warmed to give a dark red solution. The solution was washed with three portions (100 ml. each) of chloroform, heated to its boiling point, treated with decolorizing charcoal, and was filtered whilst hot. The cooled filtrate was acidified with concentrated hydrochloric acid. The precipitated solid (18.3 gm.) was collected, and had M.P. 168.5–171° C. Part of the product was recrystallized twice from aqueous ethanol to give 5 - (5 - benzyloxy - 3 - indolylmethyl) tetrazole as light tan plates, M.P. 173–175° C.

*Analysis.*—Calcd. for $C_{17}H_{15}N_5O$: C, 66.87; H, 4.95; N, 22.94. Found: C, 67.11; H, 5.07; N, 23.32.

EXAMPLE 18

Preparation of 5-[5-benzyloxy-1-(4-chlorobenzoyl)-3-indolylmethyl]tetrazole

A solution of 5 - (5 - benzyloxy - 3 - indolylmethyl) tetrazole (4.0 gm., 0.0131 mol) in dimethylformamide (20 ml.) was added dropwise to a cooled (ice/water bath), stirred suspension of sodium hydride (1.072 gm. of a 58.6% sodium hydride dispersion in mineral oil, 0.0262 mol of sodium hydride) in dimethylformamide (20 ml.). The resulting mixture was warmed at 45° C. for 15 minutes until solution was complete. The solution was cooled with an ice/water bath, when a solution of p-chlorobenzoyl chloride (2.31 gm., 0.0131 mol) in dimethylformamide (10 ml.) was added dropwise. The reaction mixture was stirred for 1.25 hours at 0° C., followed by 0.5 hour at 25° C.

The mixture was filtered and the filtrate reduced to dryness in a rotating evaporator. An aqueous suspension of the residue was acidified with concentrated hydrochloric acid. The precipitated solid was collected and crystallized from aqueous acetonitrile. The product (1.57 gm.) was recrystallized twice from methanol to give 5-[5 - benzyloxy - 1 - (4 - chlorobenzoyl) - 3 - indolylmethyl]tetrazole as long white needles, M.P. 197–199° C. (decomposition).

*Analysis.*—Calcd. for $C_{24}H_{18}ClN_5O_2$: C, 64.94; H, 4.08; Cl, 7.99; N, 15.78. Found: C, 64.82; H, 4.06; Cl, 8.14; N, 15.61.

EXAMPLE 19

Preparation of 5-[1-(4-chlorobenzoyl)-5-hydroxy-3-indolylmethyl]tetrazole

A suspension of 5 - [5 - benzyloxy - 1 - (4 - chlorobenzoyl) - 3 - indolylmethyl]tetrazole (3.86 gm.) in ethyl acetate (200 ml.) was shaken in the presence of 5% palladium on carbon (3.0 gm.) under 2-3 atmospheres of hydrogen until the uptake of hydrogen ceased (6 hours). The reaction mixture was filtered, and the filtrate reduced in volume in a rotating evaporator until crystallization of the product commenced. The product (1.94 gm.) M.P. 245.5–247.5° C. was combined with an additional crop (0.27 gm.) of crystals (M.P. 239–241° C.) obtained from the mother liquors, and the combined fractions were recrystallized from acetonitrile followed by aqueous ethanol to give 5 - [1 - (4 - chlorobenzoyl)-5-hydroxy - 3 - indoylylmethyl]tetrazole as white needles, M.P. 248.5–250° C. (decomposition).

EXAMPLE 20

Preparation of 5-(5-chloro-2-methyl-3-indolylmethyl)tetrazole

A mixture of 5 - chloro - 2 - methyl - 3 - indolylacetonitrile (3.5 gm., 0.0171 mol), sodium azide (2.22 gm., 0.0342 mol) and ammonium chloride (1.83 gm., 0.0342 mol) in dimethylformamide (28 ml.) was heated, with stirring, at about 134° C. for 24 hours. The cooled reaction mixture was reduced to dryness in a rotating evaporator. Water (70 ml.) and potassium carbonate (5.0 gm.) were added to the residue. The resulting suspension was washed with three portions of chloroform (30 ml. each) to leave a clear solution. The aqueous solution was heated to near boiling and was treated with decolorizing charcoal. The hot solution was filtered and the cooled filtrate acidified to pH 2 with concentrated hydrochloric acid. The precipitated solid (3.26 gm.) was collected and recrystallized twice from aqueous ethanol to give 5 - (5 - chloro - 2 - methyl - 3-indolylmethyl)tetrazole as white needles, M.P. 202.5–203.5° C. (decomposition).

*Analysis.*—Calcd. for $C_{11}H_{10}ClN_5$: C, 53.34; H, 4.07; N, 28.28. Found: C, 53.40; H, 4.37; N, 28.23.

EXAMPLE 21

Preparation of 5-[5-chloro-1-(4-chlorobenzoyl)-2-methyl-3-indolylmethyl]tetrazole A solution of 5 - (5 - chloro - 2 - methyl - 3 - indolylmethyl tetrazole (5.0 gm., 0.0202 mol) in dry dimethylformamide (25 ml.) was added dropwise to a stirred suspension of sodium hydride (1.7 gm. of a 58.6% sodium hydride dispersion in mineral oil, 0.0415 mol of sodium hydride) in dry dimethylformamide (20 ml.), the suspension being cooled with an ice/water bath. When the addition was complete, the mixture was stirred at room temperature for about 20 minutes. The resulting solution was recooled, and to this solution was added dropwise over a period of 1 hour a solution of p-chlorobenzoyl chloride (3.6 gm., 0.0206 mol) in dimethylformamide (15 ml.). The reaction mixture was stirred at room temperature for 30 minutes, then allowed to stand at 5° C. for 17 hours.

The mixture was filtered, and the filtrate reduced to dryness in a rotating evaporator at about 40° C. A cloudy solution of the residue in cold water (400 ml.) was acidified to pH 2 with concentrated hydrochloric acid. The precipitated solid was collected, washed with water, and dried. A solution of the dried material in acetonitrile was washed with n-pentane to remove any mineral oil. The acetonitrile solution was reduced to dryness, and the residue crystallized from methanol. Two recrystallizations from ethyl acetate gave 5-[5-chloro-1-(4-chlorobenzoyl)-2-methyl-3-indolylmethyl]tetrazole (1.51 gm. after first recrystallization) as tiny colorless needles, M.P. 226–228° C. (decomposition).

EXAMPLE 22

Preparation of 5-(1-benzoyl-3-indolylmethyl)tetrazole 5-(1-benzoyl-3-indolylmethyl)tetrazole was prepared from 5-(3-indolylmethyl)tetrazole (5.0 gm., 0.0251 mol) and benzoyl chloride (3.53 gm., 0.0251 mol) by a method similar to that described for the preparation of 5-[1-(3-chlorobenzoyl)-3-indolylmethyl]tetrazole. A solution of the precipitated crude product in acetonitrile was washed with n-pentane to remove any mineral oil present. The acetonitrile solution was reduced to dryness to leave a gummy product which crystallized on standing. The crystalline solid (3.9 gm.) was collected after being washed with a small volume of cold methanol. The solid was recrystallized from methanol to give 5-(1-benzoyl-3-indolylmethyl)tetrazole as yellow prisms, M.P. 84–87° C. A proton magnetic resonance spectrum indicated that the product had crystallized with one molecule of methanol for each molecule of tetrazole.

EXAMPLE 23

Preparation of 5-[1-(4-fluorobenzoyl)-3-indolylmethyl]tetrazole 5-(3-indolylmethyl)tetrazole (7.0 gm., 0.0352 mol) was treated with p-fluorobenzoyl chloride (5.58 gm., 0.0352 mol) according to a procedure similar to that described for the preparation of 5-[1-(3-chlorobenzoyl)-3-indolylmethyl]tetrazole. The precipitated crude product was collected and dried, washed with ice-cold methanol, and finally crystallized from methanol to give off-white crystals, 7.6 gm., M.P. 193–194° C. with softening and resetting at 97–100° C. The product was recrystallized twice from ethyl acetate to give 5-[1-(4-fluorobenzoyl)-3-indolylmethyl]tetrazole as off-white crystals, M.P. 183.5–184.5° C.

*Analysis.*—Calcd. for $C_{17}H_{12}FN_5O$: C, 63.54; H, 3.77; N, 21.80. Found: C, 63.49; H, 3.82; N, 21.88.

EXAMPLE 24

Preparation of 5-[1-(2-methoxybenzoyl)-3-indolylmethyl]tetrazole

In a manner similar to that described for the preparation of 5-[1-(3-chlorobenzoyl)-3-indolylmethyl]tetrazole, 5-(3-indolylmethyl)tetrazole (5.0 gm., 0.0251 mol) was treated with o-methoxybenzoyl chloride (4.3 gm., 0.0252 mol). The precipitated crude product was collected, dried, and well washed with cold methanol (50 ml.). The washed product was recrystallized from ethyl acetate to give colorless crystals, 4.8 gm., M.P. 211–213° C. Recrystallization from ethyl acetate gave 5-[1-(2-methoxybenzoyl)-3-indolylmethyl]tetrazole as colorless crystals, M.P. 213–214° C.

*Analysis.*—Calcd. for $C_{18}H_{15}N_5O_2$: C, 64.85; H, 4.54; N, 21.01. Found: C, 65.02; H, 4.72; N, 21.17.

EXAMPLE 25

Preparation of 5-bromo-3-indolylacetonitrile

Methyl iodide (20 ml.) was added over 15 minutes to a cooled (ice-water bath) solution of 5-bromogramine (12.6 gm.) in absolute ethanol (250 ml.). The reaction mixture was allowed to stand at 5° C. for 18 hours. The ethanol was removed in a rotating evaporator to leave crude 5-bromogramine methiodide as a light-orange gummy solid.

A mixture of the crude methiodide and potassium cyanide (36.0 gm.) in water (280 ml.) was heated over a period of 20 minutes to 80° C. This temperature was maintained for 2 hours. The cooled reaction mixture was extracted with chloroform. The chloroform extracts were washed with water, and dried over sodium sulfate. Removal of the chloroform solvent gave a residue which was dissolved in hot acetonitrile. The acetonitrile solution deposited 5-bromogramine (2.0 gm.) on cooling. The gramine was removed by filtration. The filtrate was reduced in volume to leave a gummy residue. A solution of this residue in chloroform was washed with 10% hydrochloric acid followed by water. The chloroform solution was dried ovre sodium sulfate. The solution was reduced to dryness to give a solid residue which crystallized from carbon tetrachloride as off-white crystals (5.0 gm.), M.P. 101–103.5° C. The product was recrystallized from carbon tetrachloride to give 5-bromo-3-indolylacetonitrile as white needles, M.P. 102.5–104° C.

*Analysis.*—Calcd. for $C_{10}H_7BrN_2$: C, 51.09; H, 3.00; Br, 33.99; N, 11.92. Found: C, 51.03; H, 3.00; Br, 34.22; N, 11.80.

EXAMPLE 26

Preparation of 5-(5-bromo-3-indolylmethyl)tetrazole

A mixture of 5-bromo-3-indolylacetonitrile (50.0 gm., 0.213 mol), sodium azide (19.5 gm., 0.300 mol) and ammonium chloride (16.05 gm., 0.300 mol) in dimethylformamide (300 ml.) was heated, with stirring, at about 140° C. for 24 hours. The cooled reaction mixture was reduced to dryness in a rotating evaporator. The gummy liquid residue was suspended in water (400 ml.) to which potassium carbonate (30.0 gm.) was added. The mixture was gently warmed on a steam bath, then filtered. The filtrate was washed with chloroform, heated gently and treated with decolorizing charcoal, and was filtered whilst hot. The cooled filtrate was acidified to pH 2 with concentrated hydrochloric acid. The precipitated crystalline product (45.0 gm.) had M.P. 206–207.5° C. (decomposition). A portion of the product was recrystallized twice from aqueous methanol to give 5-(5-bromo-3-indolylmethyl)tetrazole as white needles, M.P. 213–215° C. (decomposition).

EXAMPLE 27

Preparation of 5-[5-bromo-1-(4-chlorobenzoyl)-3-indolylmethyl]tetrazole

In a manner similar to that described for the preparation of 5-[1-(3-chlorobenzoyl)-3-indolylmethyl]tetrazole, 5-(5-bromo-3-indolylmethyl)tetrazole (7.3 gm., 0.0262 mol) was treated with p-chlorobenzoyl chloride (5.04 gm., 0.0288 mol). A solution of the precipitated crude product in acetonitrile was washed with three portions of n-pentane. The acetonitrile solution was reduced in volume until the product commenced to crystallize. The crystalline solid (4.6 gm.), M.P. 236–237° C. (decomposition) was collected by filtration. The filtrate was reduced to dryness, and the residue crystallized from ethanol to give an additional 0.8 gm. of product, M.P. 234–235° C. (decomposition). The combined products were recrystallized twice from ethanol to give 5-[5-bromo-1-(4-chlorobenzoyl)-3-indolylmethyl]tetrazole as long needles, M.P. 239–240° C. (decomposition).

*Analysis.*—Calcd. for $C_{17}H_{11}BrClN_5I$: C, 49.00; H, 2.66; N, 16.81. Found: C, 49.46; H, 2.81; N, 17.06.

EXAMPLE 28

Preparation of 5-(5-nitro-3-indolylmethyl)tetrazole

A mixture of 5-nitro-3-indolylacetonitrile (5.0 gm., 0.0249 mol), sodium azide (2.36 gm., 0.0364 mol) and ammonium chloride (1.95 gm., 0.0364 mol) in dimethylformamide (30 ml.) was heated, with stirring, at about 128° C. for 19 hours. The reaction mixture was reduced to dryness. The gummy residue was treated with water (200 ml.) and potassium carbonate (10.0 gm.). The mixture was filtered. The filtrate was washed with chloroform, treated at 80° C. with decolorizing charcoal, and filtered. The cooled filtrate was acidified to pH 2 with concentrated hydrochloric acid. The precipitated product was recrystallized from aqueous ethanol to give orange crystals (2.8 gm.), M.P. 224–225° C. (decomposition). The product was recrystallized from aqueous ethanol to give 5-(5-nitro-3-indolylmethyl)tetrazole as orange needles, M.P. 227–228° C. (decomposition).

*Analysis.*—Calcd. for $C_{10}H_8N_6O_2$: C, 49.18; H, 3.30; N, 34.42. Found: C, 49.48; H, 3.63; N, 34.35.

EXAMPLE 29

Preparation of 5-[1-(4-chlorobenzoyl)-5-nitro-3-indolylmethyl]tetrazole

5-[1-(4-chlorobenzoyl) - 5 - nitro - 3 - indolylmethyl]tetrazole was prepared from 5-(5-intro-3-indolylmethyl)tetrazole (5.0 gm., 0.0204 mol) and p-chlorobenzyl chloride (3.58 gm., 0.0204 mol) by a method similar to that described for the preparation of 5-[1-(3-chlorobenzoyl)-3-indolylmethyl]tetrazole. The crude precipitated product was crystallized from ethanol to give a total of 4.0 gm. of product. The product was recrystallized twice from n-butanol to give 5-[1-(4-chlorobenzyl)-5-nitro-3-indolylmethyl]tetrazole as tiny orange needles, M.P. 247–248° C. (decomposition).

*Analysis.*—Calcd. for $C_{17}H_{11}ClN_6O_3$: C, 53.34; H, 2.90; Cl, 9.26; N, 21.96. Found: C, 53.42; H, 3.00; Cl, 9.36; N, 21.89.

EXAMPLE 30

Preparation of 5-[5-amino-1-(4-chlorobenzoyl)-3-indolylmethyl]tetrazole

A suspension of 5-[1-(4-chlorobenzoyl)-5-nitro-3-indolylmethyl]tetrazole (1.56 gm.) in methanol (100 ml.) was shaken in the presence of 10% palladium on carbon (0.8 gm.) under 2–3 atmospheres of hydrogen until the uptake of hydrogen ceased (2.5 hours). The reaction mixture was filtered. The collected solid was extracted with boiling ethanol. The ethanol extract was reduced in volume, and upon cooling deposited a crystalline solid (500 mg.), M.P. 165° C. with prior softening. The solid was recrystallized from ethanol to give 5-[5-amino-1-(4-chlorobenzoyl)-3-indolylmethyl]tetrazole as pale yellow crystals, M.P. 195° C. (with prior softening and decomposition).

*Analysis.*—Calcd. for $C_{17}H_{13}ClN_6O$: Cl, 10.15. Found: Cl, 9.86.

EXAMPLE 31

When, in the procedure of Example 5, 5-(3-indolylmethyl)tetrazole is replaced by an equal molar amount of 5-(4-methoxy-3-indolylmethyl)tetrazole,
5-(6-methoxy-3-indolylmethyl)tetrazole,
5-(7-methoxy-3-indolylmethyl)tetrazole,
5-(6-iodo-3-indolylmethyl)tetrazole,
5-(4-trifluoromethyl-3-indolylmethyl)tetrazole,
5-(5-trifluoromethyl-3-indolylmethyl)tetrazole,
5-(6-trifluoromethyl-3-indolylmethyl)tetrazole,
5-(7-trifluoromethyl-3-indolylmethyl)tetrazole,
5-(4-chloro-5-methoxy-3-indolylmethyl)tetrazole,
5-(5-fluoro-3-indolylmethyl)tetrazole,
5-(5-phenyl-7-methoxy-3-indolylmethyl)tetrazole,
5-(5-methyl-3-indolylmethyl)tetrazole,
5-(6-propyl-3-indolymethyl)tetrazole,
5-(4-butyl-3-indolylmethyl)tetrazole,
5-(5-phenyl-3-indolylmethyl)tetrazole,
5-(5-allyl-3-indolylmethyl)tetrazole,
5-(4-methyl-5-trifluoromethyl-3-indolylmethyl)tetrazole,
5-(4-methyl-5-methoxy-3-indolylmethyl)tetrazole,
5-(4,5-dimethyl-3-indolylmethyl)tetrazole,
5-(4-benzyloxy-3-indolylmethyl)tetrazole,
5-(5,7-dimethoxy-3-indolylmethyl)tetrazole,
5-(2-methyl-4-methoxy-3-indolylmethyl)tetrazole,
5-(7-methoxy-5-methyl-3-indolylmethyl)tetrazole,
5-(5-methylthio-3-indolylmethyl)tetrazole,
5-(5-allyloxy-3-indolylmethyl)tetrazole,
5-(4-ethyl-3-indolylmethyl)tetrazole,
5-(5-acetyl-3-indolylmethyl)tetrazole,
5-[5-(1-pyrrolidino)-3-indolylmethyl]tetrazole,
5-[4-(4-morpholino)-3-indolylmethyl]tetrazole,
5-[6-(1-1,2,5,6-tetrahydropyridino)-3-indolylmethyl]tetrazole,
5-[5-(1-piperidino)-3-indolylmethyl]tetrazole,
5-(5-trifluoromethyloxy-3-indolylmethyl)tetrazole,
5-(5-trifluoromethylthio-3-indolylmethyl)tetrazole,
5-[7-(1-aza-cyclopropyl)-3-indolylmethyl]tetrazole,
5-(5-acetamido-3-indolylmethyl)tetrazole,
5-(5-dimethylamino-3-indolylmethyl)tetrazole,
5-(6-dimethylamino-3-indolylmethyl)tetrazole,
5-(4-benzyloxy-3-indolylmethyl)tetrazole,
5-(4-chloro-3-indolylmethyl)tetrazole,
5-(5-ethoxy-3-indolylmethyl)tetrazole,
5-[6-(4-methyl-1-piperazino)-3-indolylmethyl]tetrazole,
5-(7-dimethylaminomethyl-3-indolylmethyl)tetrazole,
5-(5-dimethylaminomethyl-3-indolylmethyl)tetrazole,
5-(6-dimethylsulfamyl-3-indolylmethyl)tetrazole,
5-(4-phenyl-3-indolylmethyl)tetrazole,
5-(5-phenoxy-3-indolylmethyl)tetrazole,
5-(5-phenylthio-3-indolylmethyl)tetrazole,
5-(6-p-methylphenylthio-3-indolylmethyl)tetrazole,
5-(5-p-methylphenoxy-3-indolylmethyl)tetrazole,
5-(5-p-methylbenzyloxy-3-indolylmethyl)tetrazole,
5-(7-o-methoxybenzylthio-3-indolylmethyl)tetrazole,
5-(6-p-chlorophenylthio-3-indolylmethyl)tetrazole,
5-(5-p-chlorophenoxy-3-indolylmethyl)tetrazole,
5-[6-(1-hexamethyleneimino)-3-indolylmethyl]tetrazole,
5-(7-p-methoxyphenylthio-3-indolylmethyl)tetrazole,
5-(5-p-methoxyphenoxy-3-indolylmethyl)tetrazole,
5-(6-benzylthio-3-indolylmethyl)tetrazole,
5-(7-m-methylbenzylthio-3-indolylmethyl)tetrazole,
5-(4-o-bromobenzylthio-3-indolylmethyl)tetrazole,
5-(5-cyclopropylmethyloxy-3-indolylmethyl)tetrazole,
5-(6-cyclobutylmethyloxy-3-indolylmethyl)tetrazole,
5-(5-p-methoxybenyloxy-3-indolylmethyl)tetrazole and
5-(5-p-chlorobenzyloxy-3-indolylmethyl)tetrazole, there are obtained 5-[1-(4-chlorobenzoyl)-4-methoxy-3-indolylmethyl]tetrazole,
5-[1-(4-chlorobenzoyl)-6-methoxy-3-indolylmethyl]tetrazole,
5-[1-(4-chlorobenzoyl)-7-methoxy-3-indolylmethyl]tetrazole,
5-[1-(4-chlorobenzoyl)-6-iodo-3-indolylmethyl]tetrazole,
5-[1-(4-chlorobenzoyl)-4-trifluoromethyl-3-indolylmethyl]tetrazole,
5-[1-(4-chlorobenzoyl)-5-trifluoromethyl-3-indolylmethyl]tetrazole,
5-[1-(4-chlorobenzoyl)-6-trifluoromethyl-3-indolylmethyl]tetrazole,
5-[1-(4-chlorobenzoyl)-7-trifluoromethyl-3-indolylmethyl]tetrazole,
5-[1-(4-chlorobenzoyl)-4-chloro-5-methoxy-3-indolylmethyl]tetrazole,
5-[1-(4-chlorobenzyl)-5-fluoro-3-indolylmethyl]tetrazole,
5-[1-(4-chlorobenzoyl)-5-phenyl-7-methoxy-3-indolylmethyl]tetrazole, 5-[1-(4-chlorobenzoyl)-5-methyl-3-indolylmethyl]
  tetrazole,
5-[1-(4-chlorobenzoyl)-6-propyl-3-indolylmethyl]
  tetrazole,
5-[1-(4-chlorobenzoyl)-4-butyl-3-indolylmethyl]
  tetrazole,
5-[1-(4-chlorobenozyl)-5-phenyl-3-indolylmethyl]
  tetrazole,
5-[1-(4-chlorobenzoyl)-5-allyl-3-indolylmethyl]
  tetrazole,
5-[1-(4-chlorobenzoyl)-4-methyl-5-trifluoromethyl-3-
  indolylmethyl]tetrazole,
5-[1-(4-chlorobenzoyl)-4-methyl-5-methoxy-3-indolyl-
  methyl]tetrazole,
5-[1-(4-chlorobenzoyl)-4,5-dimethyl-3-indolylmethyl]
  tetrazole,
5-[1-(4-chlorobenzoyl)-4-benzyloxy-3-indolylmethyl]
  tetrazole,
5-[1-(4-chlorobenzoyl)-5,7-dimethoxy-3-indolyl-
  methyl]tetrazole,
5-[1-(4-chlorobenzoyl)-2-methyl-4-methoxy-3-indolyl-
  methyl]tetrazole,
5-[1-(4-chlorobenzoyl)-7-methoxy-5-methyl-3-indolyl-
  methyl]tetrazole,
5-[1-(4-chlorobenzoyl)-5-methylthio-3-indolylmethyl]
  tetrazole,
5-[1-(4-chlorobenzoyl)-5-allyloxy-3-indolylmethyl]
  tetrazole,
5-[1-(4-chlorobenzoyl)-4-ethyl-3-indolylmethyl]
  tetrazole,
5-[1-(4-chlorobenzoyl)-5-acetyl-3-indolylmethyl]
  tetrazole,
5-[1-(4-chlorobenzoyl)-5-(1-pyrrolidino)-3-indolyl-
  methyl]tetrazole,
5-[1-(4-chlorobenozyl)-4-(4-morpholino)-3-indolyl-
  methyl]tetrazole,
5-[1-(4-chlorobenzoyl)-6-(1,1,2,5,6-tetrahydropyridino)-
  3-indolymethyl]tetrazole,
5-[1-(4-chlorobenzoyl)-5-(1-piperidino)-3-indolyl-
  methyl]-tetrazole,
5-[1-(4-chlorobenzoyl)-5-trifluoromethyloxy-3-indolyl-
  methyl]-tetrazole,
5-[1-(4-chlorobenzoyl)-5-trifluoromethylthio-3-indolyl-
  methyl]-tetrazole,
5-[1-(4-chlorobenzyl)-7-(1-aza-cyclopropyl)-3-indolyl-
  methyl]-tetrazole,
5-[1-(4-chlorobenzoyl)-5-acetamido-3-indolylmethyl]
  tetrazole,
5-[1-(4-chlorobenzoyl)-5-dimethylamino-3-indolyl-
  methyl]tetrazole,
5-[1-(4-chlorobenzoyl)-6-diethylamino-3-indolyl-
  methyl]tetrazole,
5-[1-(4-chlorobenzoyl)-4-benzyloxy-3-indolylmethyl]
  tetrazole,
5-[1-(4-chlorobenzyl)-4-chloro-3-indolylmethyl]tetra-
  zole,
5-[1-(4-chlorobenzoyl)-5-ethoxy-3-indolylmethyl]tetra-
  zole,
5-[1-(4-chlorobenzoyl)-6-(4-methyl-1-piperazino)-
  3-indolylmethyl]tetrazole,
5-[1-(4-chlorobenzoyl)-7-dimethylaminomethyl-3-
  indolylmethyl]tetrazole,
5-[1-(4-chlorobenzoyl)-5-dimethylaminomethyl-3-
  indolylmethyl]tetrazole,
5-[1-(4-chlorobenzyl)-6-dimethylsulfamyl-3-indolyl-
  methyl]tetrazole,
5-[1-(4-chlorobenzyl)-4-phenyl-3-indolylmethyl]-
  tetrazole,
5-[1-(4-chlorobenzoyl)-5-phenoxy-3-indolylmethyl]-
  tetrazole,
5-[1-(4-chlorobenzoyl)-5-phenylthio-3-indolylmethyl]-
  tetrazole,
5-[1-(4-chlorobenzoyl)-6-p-methylphenylthio-3-indolyl-
  methyl]tetrazole,
5-[1-(4-chlorobenzoyl)-5-p-methylphenoxy-3-indoly-
  methyl]tetrazole,
5-[1-(4-chlorobenzoyl)-5-p-methylbenzyloxy-3-indolyl-
  methyl]tetrazole,
5-[1-(4-chlorobenzoyl)-7-o-methoxybenzylthio-3-
  indolylmethyl]tetrazole,
5-[1-(4-chlorobenzoyl)-6-p-chlorophenylthio-3-indolyl-
  methyl]tetrazole,
5-[1-(4-chlorobenzoyl)-5-p-chlorophenoxy-3-indolyl-
  methyl]tetrazole,
5-[1-(4-chlorobenzoyl)-6-(1-hexamethyleneimino)-3-
  indolylmethyl]tetrazole,
5-[1-(4-chlorobenzoyl)-7-p-methoxyphenylthio-3-
  indolylmethyl]tetrazole,
5-[1-(4-chlorobenzoyl)-5-p-methoxyphenoxy-3-
  indolylmethyl]tetrazole,
5-[1-(4-chlorobenzyl)-6-benzylthio-3-indolylmethyl]-
  tetrazole,
5-[1-(4-chlorobenzoyl)-7-m-methylbenzylthio-3-
  indolylmethyl]tetrazole,
5-[1-(4-chlorobenzoyl)-4-o-bromobenzylthio-3-
  indolylmethyl]tetrazole,
5-[1-(4-chlorobenzoyl)-5-cyclopropylmethyloxy-3-
  indolylmethyl]tetrazole,
5-[1-(4-chlorobenzoyl)-6-cyclobutylmethyloxy-3-
  indolylmethyl]tetrazole,
5-[1-(4-chlorozoyl)-5-p-methoxybenzyloxy-3-
  indolylmethyl]tetrazole and
5-[1-(4-chlorobenzoyl)-5-p-chlorobenzyloxy-3-
  indolylmethyl]tetrazole, respectively,

EXAMPLE 32

When, in the procedure of Example 5, 5-(3-indolyl-
methyl)tetrazole is replaced by an equal molar amount of 5-(5-methoxy-4-trifluoromethyl-3-indolylmethyl)-
  tetrazole,
5-(5-methoxy-6-trifluoromethyl-3-indolylmethyl)-
  tetrazole,
5-(5-methoxy-7-trifluoromethyl-3-indolylmethyl)-
  tetrozole,
5-(5-nitro-4-trifluoromethyl-3-indolylmethyl)-
  tetrazole,
5-(5-nitro-6-trifluoromethyl-3-indolylmethyl)-
  tetrazole,
5-(5-nitro-7-trifluoromethyl-3-indolylmethyl)-tetrazole,
5-(5-methyl-4-trifluoromethyl-3-indolylmethyl)-tetrazole,
5-(5-methyl-6-trifluoromethyl-3-indolylmethyl)tetrazole,
5-(5-methyl-7-trifluoromethyl-3-indolylmethyl)tetrazole,
5-(5-dimethylamino-4-trifluoromethyl-3-indolylmethyl)-
  tetrazole and
5-(5-ethyl-4-trifluoromethyl-3-indolylmethyl)tetrazole,
there are obtained 5-[1-(4-chlorobenzoyl)-5-methoxy-4-trifluoromethyl-3-
  indolylmethyl]tetrazole,
5-[1-(4-chlorobenzoyl)-5-methoxy-6-trifluoromethyl-3-
  indolylmethyl]tetrazole,
5-[1-(4-chlorobenzoyl)-5-methoxy-7-trifluoromethyl-3-
  indolylmethyl]tetrazole,
5-[1-(4-chlorobenzoyl)-5-nitro-4-trifluoromethyl-3-
  indolylmethyl]tetrazole,
5-[1-(4-chlorobenzoyl)-5-nitro-6-trifluoromethyl-3-
  indolylmethyl]tetrazole,
5-[1-(4-chlorobenzoyl)-5-nitro-7-trifluoromethyl-3-
  indolylmethyl]tetrazole,
5-[1-(4-chlorobenzoyl)-5-methyl-4-trifluoromethyl-3-
  indolylmethyl]tetrazole,
5-[1-(4-chlorobenzoyl)-5-methyl-6-trifluoromethyl-
  3-indolylmethyl]tetrazole,
5-[1-(4-chlorobenzoyl)-5-methyl-7-trifluoromethyl-
  3-indolylmethyl]tetrazole,
5-[1-(4-chlorobenzoyl)-5-dimethylamino-4-trifluoro-
  methyl-3-indolylmethyl]tetrazole and
5-[1-(4-chlorobenzoyl)-5-ethyl4-trifluoromethyl-
  3-indolylmethyl]tetrazole,
respectively.

EXAMPLE 33

When, in the procedure of Example 5, 5-(3-indolylmethyl)tetrazole is replaced by an equal molar amount of 5-(2-methyl-3-indolylmethyl)tetrazole,
5-(2-phenyl-3-indolylmethyl)tetrazole,
5-(2-allyl-3-indolylmethyl)tetrazole,
5-(2-trifluoromethyl-3-indolylmethyl)tetrazole,
5-(2-methyl-5-methoxy-3-indolylmethyl)tetrazole,
5-(2,5-dimethyl-3-indolylmethyl)tetrazole,
5-(2-methyl-5-nitro-3-indolylmethyl)tetrazole,
5-(2-methyl-6-dimethylamino-3-indolylmethyl)tetrazole,
5-[2-methyl-5-(1-pyrrolidino)-3-indolylmethyl]tetrazole,
5-(2-methyl-5-dimethylamino-3-indolylmethyl)tetrazole,
5-(2-methyl-5-acetamido-3-indolylmethyl)tetrazole,
5-(2-methyl-5-diethylamino-3-indolylmethyl)tetrazole,
5-(2-methyl-6-ethoxy-3-indolylmethyl)tetrazole,
5-[2-methyl-5-(4-methyl-1-piperazino)-3-indolylmethyl]tetrazole,
5-[2-methyl-5-(4-morpholino)-3-indolylmethyl]tetrazole,
5-(2-methyl-5-ethoxy-3-indolylmethyl)tetrazole,
5-(5-methoxy-2-methyl-4-trifluoromethyl-3-indolylmethyl)-tetrazole,
5-(5-methoxy-2-methyl-6-trifluoromethyl-3-indolylmethyl)-tetrazole,
5-(2-methyl-5-nitro-4-trifluoromethyl-3-indolylmethyl)tetrazole,
5-(2-methyl-5-nitro-6-trifluoromethyl-indolylmethyl)tetrazole,
5-(2,5-dimethyl-4-trifluoromethyl-3-indolylmethyl)tetrazole,
5-(2,5-dimethyl-6-trifluoromethyl-3-indolylmethyl)tetrazole,
5-(2-methyl-5-trifluoromethyl-3-indolylmethyl)tetrazole,
5-(2-methyl-7-trifluoromethyl-3-indolylmethyl)tetrazole,
5-(5-methoxy-2-methyl-7-trifluoromethyl-3-indolylmethyl)-tetrazole,
5-(2-methyl-5-nitro-7-trifluoromethyl-3-indolylmethyl)tetrazole,
5-(6-methoxy-2-methyl-4-trifluoromethyl-3-indolylmethyl)-tetrazole,
5-(6-methoxy-2-methyl-6-trifluoromethyl-3-indolylmethyl)-tetrazole,
5-(2-methyl-6-nitro-4-trifluoromethyl-3-indolylmethyl)tetrazole,
5-(2-methyl-6-nitro-6-trifluoromethyl-3-indolylmethyl)tetrazole,
5-(2,7-dimethyl-4-trifluoromethyl-3-indolylmethyl)tetrazole,
5-(2,7-dimethyl-6-trifluoromethyl-3-indolylmethyl)tetrazole,
5-(2-allyl-5-methoxy-3-indolylmethyl)tetrazole,
5-(2-methyl-6-methoxy-3-indolylmethyl)tetrazole,
5-(2-phenyl-5-methoxy-3-indolylmethyl)tetrazole,
5-(2-trifluoromethyl-5-methoxy-3-indolylmethyl)tetrazole,
5-(2,5-diethyl-3-indolylmethyl)tetrazole,
5-(2-methyl-4-methoxy-3-indolylmethyl)tetrazole,
5-[1-(3-indolyl)-2,2,2,-trifluoroethyl]tetrazole,
5-[1-(3-indolyl)ethyl]tetrazole,
5-[2-(3-indolyl)-2-propyl]tetrazole,
5-[1-(2-methyl-3-indolyl)ethyl]tetrazole,
5-[1-(5-methoxy-3-indolyl)ethyl]tetrazole,
5-[1-(5-methoxy-2-methyl-3-indolyl)ethyl]tetrazole,
5-[1-(2-trifluoromethyl-3-indolyl)ethyl]tetrazole,
5-[1-5-methoxy-2-trifluoromethyl-3-indolyl)ethyl]tetrazole,
5-[1-(2-methyl-3-indolyl)-2,2,2-trifluoroethyl]tetrazole,
5-[1-(5-methoxy-3-indolyl)-2,2,2-trifluoroethyl]tetrazole,
5-[1-(5-methoxy-2-methyl-3-indolyl)-2,2,2-trifluoroethyl]tetrazole,
5-[1-(2-trifluoromethyl-3-indolyl)-2,2,2-trifluoroethyl]-tetrazole and
5-[1-(5-methoxy-2-trifluoromethyl-3-indolyl)-2,2,2-trifluoroethyl]tetrazole, there are obtained, 5-[1-(4-chlorobenzoyl)-2-methyl-3-indolylmethyl]tetrazole,
5-[1-(4-chlorobenzoyl)-2-phenyl-3-indolylmethyl]tetrazole,
5-[1-(4-chlorobenzoyl)-2-allyl-3-indolylmethyl]tetrazole,
5-[1-(4-chlorobenzoyl)-2-trifluoromethyl-3-indolylmethyl]-tetrazole,
5-[1-(4-chlorobenzoyl)-2-methyl-5-methoxy-3-indolylmethyl]-tetrazole,
5-[1-(4-chlorobenzoyl)-2,5-dimethyl-3-indolylmethyl]tetrazole,
5-[1-(4-chlorobenzoyl)-2-methyl-5-nitro-3-indolylmethyl]tetrazole,
5-[1-(4-chlorobenzoyl)-2-methyl-6-dimethylamino-3-indolylmethyl]tetrazole,
5-[1-(4-chlorobenzoyl)-2-methyl-5-(1-pyrrolidino)-3-indolylmethyl]tetrazole,
5-[1-(4-chlorobenzoyl)-2-methyl-5-dimethylamino-3-indolylmethyl]tetrazole,
5-[1-(4-chlorobenzoyl)-2-methyl-5-acetamido-3-indolylmethyl]tetrazole,
5-[1-(4-chlorobenzoyl)-2-methyl-5-diethylamino-3-indolylmethyl]tetrazole,
5-[1-(4-chlorobenzoyl)-2-methyl-6-ethoxy-3-indolylmethyl]tetrazole,
5-[1-4-chlorobenzoyl)-2-methyl-5-(4-methyl-1-piperazino)-3-indolylmethyl]tetrazole,
5-[1-(4-chlorobenzoyl)-2-methyl-5-(4-morpholino)-3-indolylmethyl]tetrazole,
5-[1-(4-chlorobenzoyl)-2-methyl-5-ethoxy-3-indolylmethyl]tetrazole,
5-[1-(4-chlorobenzoyl)-5-methoxy-2-methyl-4-trifluoromethyl-3-indolylmethyl]tetrazole,
5-[1-(4-chlorobenzoyl)-5-methoxy-2-methyl-6-trifluoromethyl-3-indolylmethyl]tetrazole,
5-[1-(4-chlorobenzoyl)-2-methyl-5-nitro-4-trifluoromethyl-3-indolylmethyl]tetrazole,
5-[1-(4-chlorobenzoyl)-2-methyl-5-nitro-6-trifluoromethyl-3-indolylmethyl]tetrazole,
5-[1-(4-chlorobenzoyl)-2,5-dimethyl-4-trifluoromethyl-3-indolylmethyl]tetrazole,
5-[1-(4-chlorobenzoyl)-2,5-dimethyl-6-trifluoromethyl-3-indolylmethyl]tetrazole,
5-[1-(4-chlorobenzoyl)-2-methyl-5-trifluoromethyl-3-indolylmethyl]tetrazole,
5-[1-(4-chlorobenzoyl)-2-methyl-7-trifluoromethyl-3-indolylmethyl]tetrazole,
5-[1-(4-chlorobenzoyl)-5-methoxy-2-methyl-7-trifluoromethyl-3-indolylmethyl]tetrazole,
5-[1-(4-chlorobenzoyl)-2-methyl-5-nitro-7-trifluoromethyl-3-indolylmethyl]tetrazole,
5-[1-(4-chlorobenzoyl)-2,5-dimethyl-7-trifluoromethyl-3-indolylmethyl]tetrazole,
5-[1-(4-chlorobenzoyl)-6-methoxy-2-methyl-4-trifluoromethyl-3-indolylmethyl]tetrazole,
5-[1-(4-chlorobenzoyl)-6-methoxy-2-methyl-6-trifluoromethyl-3-indolylmethyl]tetrazole,
5-[1-(4-chlorobenzoyl)-2-methyl-6-nitro-4-trifluoromethyl-3-indolylmethyl]tetrazole,
5-[1-(4-chlorobenzoyl)-2-methyl-6-nitro-6-trifluoromethyl-3-indolylmethyl]tetrazole,
5-[1-(4-chlorobenzoyl)-2,7-dimethyl-4-trifluoromethyl-3-indolylmethyl]tetrazole,
5-[1-(4-chlorobenzoyl)-2,7-dimethyl-6-trifluoromethyl-3-indolylmethyl]tetrazole, 5-[1-(4-chlorobenzoyl)-2-allyl-5-methoxy-3-indolyl-
  methyl]tetrazole,
5-[1-(4-chlorobenzoyl)-2-methyl-6-methoxy-3-indolyl-
  methyl]tetrazole,
5-[1-(4-chlorobenzoyl)-2-phenyl-5-methoxy-3-indolyl-
  methyl]tetrazole,
5-[1-(4-chlorobenzoyl)-2-trifluoromethyl-5-methoxy-
  3-indolylmethyl]tetrazole,
5-[1-(4-chlorobenzoyl)-2,5-diethyl-3-indolyl-
  methyl]tetrazole,
5-[1-(4-chlorobenzoyl)-2-methyl-4-methoxy-3-
  indolylmethyl]tetrazole,
5-{1-[1-(4-chlorobenzoyl)-3-indolyl]-2,2,2-
  trifluoroethyl}tetrazole,
5-{1-[1-(4-chlorobenzoyl)-3-indolyl]-ethyl}tetrazole,
5-{2-[1-(4-chlorobenzoyl)-3-indolyl]-2-
  propyl}tetrazole,
5-{1-[1-(4-chlorobenzoyl)-2-methyl-3-
  indolyl]ethyl}tetrazole,
5-{1-[1-(4-chlorobenzoyl)-5-methoxy-3-
  indolyl]ethyl}tetrazole,
5-{1-[1-(4-chlorobenzoyl)-5-methoxy-2-methyl-3-
  indolyl]ethyl}tetrazole,
5-[1-[1-(4-chlorobenzoyl)-2-trifluoromethyl-3-
  indolyl]ethyl]tetrazole,
5-{1-[1-(4-chlorobenzoyl)-5-methoxy-2-trifluoro-
  methyl-3-indolyl]ethyl}tetrazole,
5-{1-[1-(4-chlorobenzoyl)-2-methyl-3-indolyl]-2,2,2-
  trifluoroethyl}tetrazole,
5-{1-[1-(4-chlorobenzoyl)-5-methoxy-3-indolyl]-2,2,2-
  trifluoroethyl}tetrazole,
5-{1-[1-(4-chlorobenzoyl)-5-methoxy-2-methyl-3-
  indolyl]-2,2,2-trifluoorethyl}tetrazole,
5-{1-[1-(4-chlorobenzoyl)-2-trifluoromethyl-3-
  indolyl]-2,2,2-trifluoroethyl}tetrazole and
5-{1-[1-(4-chlorobenzoyl)-5-methoxy-2-trifluoromethyl-
  3-indolyl]-2,2,2-trifluoroethyl}tetrazole, respectively.

EXAMPLE 34

When, in the procedure of Example 5, p-chlorobenzoyl chloride is replaced by an equal molar amount of α-naphthoyl chloride,
3-methoxybenzoyl chloride,
2,4-dichlorobenzoyl chloride,
2-methyl-4-methylthiobenzoyl chloride,
4-bromobenzoyl chloride,
3-fluorobenzoyl chloride,
4-iodobenzoyl chloride,
2-trifluoromethylbenzoyl chloride,
3-iodobenzoyl chloride,
3-dimethylaminobenzoyl chloride,
3-nitrobenzoyl chloride,
4-phenylbenzoyl chloride,
4-acetylbenzoyl chloride,
4-benzyloxybenzoyl chloride,
3-phenylbenzoyl chloride,
2-benzyloxybenzoyl chloride,
3-bromobenzoyl chloride,
2-fluorobenzoyl chloride,
3,4-dimethoxybenzoyl chloride,
2,6-dimethoxybenzoyl chloride,
4-ethoxybenzoyl chloride,
4-propoxybenzoyl chloride,
4-(4-methylbenzyloxy)benzoyl chloride,
4-(4-methoxybenzyloxy)benzoyl chloride,
4-(4-chlorobenzyloxy)benzoyl chloride,
3-methylthiobenzoyl chloride,
2-methylbenzoyl chloride,
3-methylbenzoyl chloride,
4-methylbenzoyl chloride,
4-propylbenzoyl chloride,
4-trifluoromethyloxybenzoyl chloride,
4-trifluoromethylthiobenzoyl chloride,
4-phenoxybenzoyl chloride,
4-(4-chlorophenyl)benzoyl chloride,
3-(3-chlorophenyl)benzoyl chloride,
4-(4-methylphenyl)benzoyl chloride,
4-(4-methoxyphenyl)benzoyl chloride,
4-phenylthiobenzoyl chloride,
4-(4-methylphenylthio)benzoyl chloride,
4-(4-methoxyphenylthio)benzoyl chloride,
4-(4-chlorophenylthio)benzoyl chloride,
4-trifluoroacetylbenzoyl chloride,
2-difluoroacetylbenzoyl chloride,
3-monofluoroacetylbenzoyl chloride,
4-dimethylsulfamylbenzoyl chloride,
2-bromobenzoyl chloride,
4-cyanobenzoyl chloride,
4-nitrobenzoyl chloride,
3-ethoxybenzoyl chloride,
2-nitrobenzoyl chloride,
4-trifluoroacetoxybenzoyl chloride,
2-difluoroacetoxybenzoyl chloride,
4-monofluoroacetoxybenzoyl chloride,
4-acetoxybenzoyl chloride,
4-dimethylaminobenzoyl chloride,
4-acetamidobenzoyl chloride,
4-diethylaminobenzoyl chloride,
4-benzylthiobenzoyl chloride,
3-dimethylcarboxamidobenzoyl chloride,
4-carbethoxybenzoyl chloride,
2-methylsulfinylbenzoyl chloride,
4-methylsulfonylbenzoyl chloride,
4-(4-chlorobenzylthio)benzoyl chloride,
4-(4-methyoxybenzylthio)benzoyl chloride,
4-(4-methylbenzylthio)benzoyl chloride,
2,4-dimethoxybenzoyl chloride,
2-methoxy-4-chlorobenzoyl chloride,
α-4-chloronaphthoyl chloride,
β-naphthoyl chloride,
β-1,4-dichloronaphthoyl chloride,
α-4-methoxynaphthoyl chloride,
α-6-methoxynaphthoyl chloride and
α-4,5-dimethoxynaphthoyl chloride, there are obtained, 5-[1-(α-naphthoyl)-3-inodolylmethyl]tetrazole,
5-[1-(3-methoxybenzoyl)-3-indolylmethyl]tetrazole,
5-[1-(2,4-dichlorobenzoyl)-3-indolylmethyl]tetrazole,
5-[1-(2-methyl-4-methylthiobenzoyl)-3-
  indolylmethyl]tetrazole,
5-[1-(4-bromobenzoyl)-3-indolylmethyl]tetrazole,
5-[1-(3-fluorobenzoyl)-3-indolylmethyl]tetrazole,
5-[1-(4-iodobenzoyl)-3-indolylmethyl]tetrazole,
5-[1-(2-trifluoromethylbenzoyl)-3-
  indolylmethyl]tetrazole,
5-[1-(3-iodobenzoyl)-3-indolylmethyl]tetrazole,
5-[1-(3-dimethylaminobenzoyl)-3-
  indolylmethyl]tetrazole,
5-[1-(3-nitrobenzoyl)-3-indolylmethyl]tetrazole,
5-[1-(4-phenylbenzoyl)-3-indolylmethyl]tetrazole,
5-[1-(4-acetylbenzoyl)-3-indolylmethyl]tetrazole,
5-[1-(4-benzyloxybenzoyl)-3-indolylmethyl]tetrazole,
5-[1-(3-phenylbenzoyl)-3-indolylmethyl]tetaazole,
5-[1-(2-benzyloxybenzoyl)-3-indolylmethyl]tetrazole,
5-[1-(3-bromobenzoyl)-3-indolylmethyl]tetrazole,
5-[1-(2-fluorobenzoyl)-3-indolylmethyl]tetrazole,
5-[1-(3,4-dimethoxybenzoyl)-3-indolylmethyl]tetrazole,
5-[1-(2,6-dimethoxybenzoyl)-3-indolylmethyl]tetrazole,
5-[1-(4-ethoxybenzoyl)-3-indolylmethyl]tetrazole,
5-[1-(4-propoxybenzoyl)-3-indolylmethyl]tetrazole,
5-{1-[4-(4-methylbenzoyloxy)benzoyl]-3-
  indolylmethyl}tetrazole,
5-{1-[4-(4-methoxybenzyloxy)benzoyl]-3-
  indolylmethyl}tetrazole,
5-{1-[4-(4-chlorobenzyloxy)benzoyl]-3-
  indolylmethyl}tetrazole,
5-[1-(3-methylthiobenzoyl)-3-indolylmethyl]tetrazole,
5-[1-(2-methylbenzoyl)-3-indolylmethyl]tetrazole,
5-[1-(3-methylbenzoyl)-3-indolylmethyl]tetrazole.

5-[1-(4-methylbenzoyl)-3-indolylmethyl]tetrazole,
5-[1-(4-propylbenzoyl)-3-indolylmethyl]tetrazole,
5-[1-(4-trifluoromethyloxybenzoyl)-3-
  indolylmethyl]tetrazole,
5-[1-(4-trifluoromethylthiobenzoyl)-3-
  indolylmethyl]tetrazole,
5-[1-(4-phenoxybenzoyl)-3-indolylmethyl]tetrazole,
5-{1-[4-(4-chlorophenyl)benzoyl]-3-
  indolylmethyl}tetrazole,
5-{1-[3-(3-chlorophenyl)benzoyl]-3-
  indolylmethyl}tetrazole,
5-{1-[4-(4-methylphenyl)benzoyl]-3-
  indolylmethyl}tetrazole,
5-{1-[4-(4-methoxyphenyl)benzoyl]-3-
  indolylmethyl}tetrazole,
5-[1-(4-phenylthiobenzoyl)-3-indolylmethyl]tetrazole,
5-{1-[4-(4-methylphenyl)thiobenzoyl]-3-
  indolylmethyl}tetrazole,
5-{1-[4-(4-methoxyphenyl)thiobenzoyl]-3-
  indolylmethyl}tetrazole,
5-{1-[4-(4-chlorophenyl)thiobenzoyl]-3-
  indolylmethyl}tetrazole,
5-[1-(4-trifluoroacetylbenzoyl)-3-indolylmethyl]tetrazole,
5-[1-(2-difluoroacetylbenzoyl)-3-indolylmethyl]tetrazole,
5-[1-(3-monofluoroacetylbenzoyl)-3-
  indolylmethyl]tetrazole,
5-[1-(4-dimethylsulfamylbenzoyl)-3-
  indolylmethyl]tetrazole,
5-[1-(2-bromobenzoyl)-3-indolylmethyl]tetrazole,
5-[1-(4-cyanobenzoyl)-3-indolylmethyl]tetrazole,
5-[1-(4-nitrobenzoyl)-3-indolylmethyl]tetrazole,
5-[1-(3-ethoxybenzoyl)-3-indolylmethyl]tetrazole,
5-[1-(2-nitrobenzoyl)-3-indolylmethyl]tetrazole,
5-[1-(4-trifluoroacetoxybenzoyl)-3-
  indolylmethyl]tetrazole,
5-[1-(2-difluoroacetoxybenzoyl)-3-
  indolylmethyl]tetrazole,
5-[1-(4-monofluoroacetoxybenzoyl)-3-
  indolylmethyl]tetrazole,
5-[1-(4-acetoxybenzoyl)-3-indolylmethyl]tetrazole,
5-[1-(4-dimethylaminobenzoyl)-3-
  indolylmethyl]tetrazole,
5-[1-(4-acetamidobenzoyl)-3-indolylmethyl]tetrazole,
5-[1-(4-diethylaminobenzoyl)-3-indolylmethyl]tetrazole,
5-[1-(4-benzylthiobenzoyl)-3-indolylmethyl]tetrazole,
5-[1-(3-dimethylcarboxamidobenzoyl)-3-
  indolylmethyl]tetrazole,
5-[1-(4-carbethoxybenzoyl)-3-indolylmethyl]tetrazole,
5-[1-(2-methylsulfinylbenzoyl)-3-
  indolylmethyl]tetrazole,
5-[1-(4-methylsulfonylbenzoyl)-3-
  indolylmethyl]tetrazole,
5-{1-[4-(4-chlorobenzylthio)benzoyl]-3-
  indolylmethyl}tetrazole,
5-{1-[4-(4-methoxybenzylthio)benzoyl]-3-
  indolylmethyl}tetrazole,
5-{1-[4-(4-methylbenzylthio)benzoyl]-3-
  indolylmethyl}tetrazole,
5-[1-(2,4-dimethoxybenzoyl)-3-indolylmethyl]tetrazole,
5-[1-(2-methoxy-4-chlorobenzoyl)-3-
  indolylmethyl]tetrazole,
5-[1-(α-4-chloronaphthoyl)-3-indolylmethyl]tetrazole,
5-[1-(β-naphthoyl)-3-indolylmethyl]tetrazole,
5-[1-(β-1,4-dichloronaphthoyl)-3-
  indolylmethyl]tetrazole,
5-[1-(α-4-methoxynaphthoyl)-3-indolylmethyl]tetrazole,
5-[1-(α-6-methoxynaphthoyl)-3-indolylmethyltetrazole
  and
5-[1-(α-4,5-dimethoxynaphthoyl)-3-indolylmethyl]
  tetrazole, respectively.

EXAMPLE 35

Hydrogenolysis of the following compounds prepared in Examples 31 and 34

5-[1-(4-chlorobenzoyl)-4-benzyloxy-3-
  indolylmethyl]tetrazole,
5-[1-(2-benzyloxybenzoyl)-3-indolylmethyl]tetrazole,
5-[1-(4-benzyloxybenzoyl)-3-
  indolylmethyl]tetrazole and
5-[1-(4-benzylthiobenzoyl)-3-indolylmethyl]tetrazole,
  produces
5-[1-(4-chlorobenzoyl)-4-hydroxy-3-
  indolylmethyl]tetrazole,
5-[1-(2-hydroxybenzoyl)-3-indolylmethyl]tetrazole,
5-[1-(4-hydroxybenzoyl)-3-indolylmethyl]tetrazole and
5-[1-(4-mercaptobenzoyl)-3-indolylmethyl]tetrazole,
  respectively.

EXAMPLE 36

Preparation of 5-[1-(4-carboxybenzoyl)-3-indolylmethyl]tetrazole 4-carbobenzoxybenzoyl chloride is reacted with 5-(3-indolylmethyl)tetrazole according to the procedure described in Example 5, to give 5-[1-(4-carbobenzoxybenzoyl)-3-indolylmethyl]tetrazole. Hydrogenolysis of this compound gives 5-[1-(4-carboxybenzoyl-3-indolylmethyl]tetrazole.

EXAMPLE 37

Preparation of 5-[1-(4-aminobenzoyl)-3-indolylmethyl]tetrazole 4-carbobenzoxyaminobenzoyl chloride is reacted with 5-(3-indolylmethyl)tetrazole according to the procedure described in Example 5, to give 5-[1-(4-carbobenzoxyaminobenzoyl)-3-indolylmethyl]tetrazole. Hydrogenolysis of this compound gives 5-[1-(4-aminobenzoyl)-3-indolyl methyl]tetrazole.

EXAMPLE 38

Preparation of 5-[1-(4-chlorobenzoyl)-6-methylamino-3-indolylmethyl]tetrazole p-Chlorobenzoyl chloride is reacted with 5-[6-(N-carbobenzoxy-N-methylamino)-3-indolylmethyl]tetrazole according to the procedure described in Example 5 to give 5-[1-(4-chlorobenzoyl)-6-(N-carbobenzoxy - N - methylamino)-3-indolylmethyl]tetrazole. Hydrogenolysis of this compound gives 5-[1-(4-chlorobenzoyl)-6-methylamino-3-indolylmethyl]tetrazole.

EXAMPLE 39

Preparation of 5-[1-(4-chlorobenzoyl)-7-aminomethyl-3-indolylmethyl]tetrazole p-Chlorobenzoyl chloride is reacted with 5-(7-carbobenzoxyaminomethyl-3-indolylmethyl)tetrazole according to the procedure described in Example 5 to give 5-[1-(4-chlorobenzoyl)-7-carbobenzoxyaminomethyl - 3 - indolylmethyl]tetrazole. Hydrogenolysis of this compound gives 5-[1-(4-chlorobenzoyl)-7-aminomethyl-3 - indolylmethyl] tetrazole.

EXAMPLE 40

Preparation of 5-[1-(4-chlorobenzoyl)-2-methyl-5-amino-3-indolylmethyl]tetrazole p-Chlorobenzoyl chloride is reacted with 5-(2-methyl-5-carbobenzoxyamino-3 - indolylmethyl)tetrazole according to the procedure described in Example 5, to give 5-[1-(4-chlorobenzoyl)-2-methyl - 5 - carbobenzoxyamino-3-indolylmethyl]tetrazole. Hydrogenolysis of this compound gives 5-[1-(4-chlorobenzoyl)-2-methyl-5-amino-3-indolylmethyl]tetrazole.

EXAMPLE 41

Preparation of 5-[1-(4-chlorobenzoyl)-2-methyl-5-methylamino-3-indolymethyl]tetrazole p-Chlorobenzoyl chloride is reacted with 5-[2-methyl-5-(N-carbobenzoxy-N-methylamino) - 3 - indolylmethyl]tetrazole according to the procedure of Example 5, to give 5-[1-(4-chlorobenzoyl) - 2 - methyl-5-(N-carbobenzoxy-N-methylamino)-3-indolylmethyl]-tetrazole. Hydrogenolysis of this compound gives 5-[1-(4-chlorobenzoyl)-2-methyl - 5 - methylamino - 3 - indolylmethyl]tetrazole.

EXAMPLE 42

Preparation of 5-[1-(4-chlorobenzoyl)-5-bis(β-hydroxyethyl)amino-3-indolymethyl]tetrazole p-Chlorobenzoyl chloride is reacted with 5-[5-bis(β-benzoxyethyl)amino-3-indolymethyl]tetrazole according to the procedure of Example 5, to give 5-[1-(4-chlorobenzoyl)-5-bis(β-benzoxyethyl)amino - 3-indolymethyl] tetrazole. Hydrogenolysis of this compound gives 5-[1-(4-chlorobenzoyl)-5-bis(β-hydroxyethyl) - amino - 3-indolylmethyl]tetrazole.

EXAMPLE 43

Preparation of 5-[1-(4-chlorobenzoyl)-2-methyl-5-bis(β-hydroxyethyl)amino-3-indolylmethyl]tetrazole p-Chlorobenzoyl chloride is reacted with 5-[2-methyl-5-bis(β-benzoxyethyl)amino - 3 - indolymethyl]tetrazole according to the procedure of Example 5, to give 5-[1-(4-chlorobenzoyl)-2-methyl-5 - bis(β - benzoxyethyl)amino-3-indolylmethyl]tetrazole. Hydrogenolysis of this compound gives 5-[1-(4-chlorobenzoyl)-2-methyl-5-bis(β-hydroxyethyl)amino-3-indolylmethyl]tetrazole.

While this invention has been described and exemplified in terms of its preferred embodiment, those skilled in the art will appreciate that modifications can be made without departing from the spirit and scope of this invention.

What is claimed is:
1. 5-[(4-chlorobenzoyl)-3-indolylmethyl]tetrazole.
2. 5-[1-(3-chlorobenzoyl)-3-indolylmethyl]tetrazole.
3. 5-[1-(4-chlorobenzoyl) - 5 - methoxy-3-indolylmethyl]tetrazole.
4. 5-[1-(3-trifluoromethylbenzoyl) - 3 - indolylmethyl]tetrazole.
5. 5-[1-(4-trifluoromethylbenzoyl) - 3 - indolylmethyl]tetrazole.

References Cited

UNITED STATES PATENTS 3,161,654  12/1964  Shen _____ 260—326.12

OTHER REFERENCES

Van de Westeringh et al.: Rec. Trav. Chim., vol 77 (1958), pp. 1107–13.

Brouwer—van Straaten et al.: Rec. Trav. Chim., vol. 77 (1958), pp. 1107–13.

NICHOLAS S. RIZZO, *Primary Examiner.*

R. J. GALLAGHER, *Assistant Examiner.*

U.S. Cl. X.R.

167—65; 260—247.1, 247.2, 268, 293.4, 294, 294.3, 294.8, 294.9, 295

UNITED STATES PATENT OFFICE
CERTIFICATE OF CORRECTION

Patent No. 3,417,096                          December 17, 1968

Peter Frederick Juby

It is certified that error appears in the above identified patent and that said Letters Patent are hereby corrected as shown below:

Column 3, line 16, "aceptable" should read -- acceptable --; lines 18 and 19, "(lower)-alkoxy and hydroxy;" should read -- (lower)alkyl, (lower)alkoxy and hydroxy; --. Column 5, line 49, "R5" should read -- $R^5$ --. Column 14, line 24, "ovre sodium" should read -- over sodium --. Column 15, line 58, "Cl, 10.15." should read -- Cl, 10.05. --. Column 18, line 73, "ethyl4-" should read -- ethyl-4- --. Column 19, line 33, "trifluoromethyl indolyl" should read -- trifluoromethyl-3-indolyl- --. Column 21 line 33, "trifluoorethyl" should read -- trifluoroethyl --. Column 22, line 59, "tetaazole," should read -- tetrazole, --. Column 26, line 4, "5-[(4-chlorobenzoyl)-" should read -- 5-[1-(4-chlorobenzoyl)- --.

Signed and sealed this 13th day of October 1970.

(SEAL)
Attest:

EDWARD M. FLETCHER, JR.                         WILLIAM E. SCHUYLER, JR.
Attesting Officer                                     Commissioner of Patents